(12) United States Patent
Qi et al.

(10) Patent No.: US 12,130,504 B2
(45) Date of Patent: Oct. 29, 2024

(54) OPTICAL FRAME GLASSES

(71) Applicants: Bei Qi, Shanghai (CN); Xiaoxu Wu, Danyang (CN)

(72) Inventors: Bei Qi, Shanghai (CN); Xiaoxu Wu, Danyang (CN)

(73) Assignees: Bei Qi, Shanghai (CN); Xiaoxu Wu, Jiangsu (CN)

( * ) Notice: Subject to any disclaimer, the term of this patent is extended or adjusted under 35 U.S.C. 154(b) by 394 days.

(21) Appl. No.: 17/606,298

(22) PCT Filed: Apr. 22, 2020

(86) PCT No.: PCT/CN2020/086180
§ 371 (c)(1),
(2) Date: Oct. 25, 2021

(87) PCT Pub. No.: WO2020/216257
PCT Pub. Date: Oct. 29, 2020

(65) Prior Publication Data
US 2022/0206320 A1    Jun. 30, 2022

(30) Foreign Application Priority Data
Apr. 25, 2019   (CN) .......................... 201910340243.2

(51) Int. Cl.
G02C 7/06          (2006.01)
(52) U.S. Cl.
CPC .................................. *G02C 7/063* (2013.01)
(58) Field of Classification Search
CPC ................................................... G02C 7/063
(Continued)

(56) References Cited

U.S. PATENT DOCUMENTS

| 5,054,904 A | 10/1991 | Bristol |
| 2006/0232743 A1 | 10/2006 | Legerton |

(Continued)

FOREIGN PATENT DOCUMENTS

| CN | 101467092 A | 6/2009 |
| CN | 201804169 U | 4/2011 |

(Continued)

OTHER PUBLICATIONS

PCT International Search Report and Written Opinion, Application No. PCT/CN2020/086180, dated Jun. 30, 2020, 7 pages.
(Continued)

*Primary Examiner* — James R Greece
(74) *Attorney, Agent, or Firm* — Armstrong Teasdale LLP

(57) ABSTRACT

The present application discloses optical frame glasses, comprising lens. The lens has a circular central area and a plurality of annular focus-increasing compensation areas surrounding the central area, the center of the circular central area coincides with the optical center of the lens, wherein focal powers of the central area and the plurality of focus-increasing compensation areas progressively increase in a radially outward direction. The optical frame glasses in the present application can eliminate high-order aberrations of eyes, thereby limiting the occurrence and development of myopia. In addition, the optical frame glasses of the present application do not touch the eyeballs, the wearing method is simple, no discomfort is caused after worn, the maintenance method is simple, and the manufacturing cost is low.

2 Claims, 4 Drawing Sheets

(58) Field of Classification Search
USPC .................................................. 351/159.42
See application file for complete search history.

(56) References Cited

U.S. PATENT DOCUMENTS

| | | | |
|---|---|---|---|
| 2011/0029073 A1* | 2/2011 | Liang | A61F 2/1613 623/5.11 |
| 2014/0211147 A1* | 7/2014 | Wei | G02C 7/06 351/159.79 |
| 2015/0219926 A1 | 8/2015 | Fujikado et al. | |

FOREIGN PATENT DOCUMENTS

| | | | | |
|---|---|---|---|---|
| CN | 103257458 | A | 8/2013 | |
| CN | 103389586 | A | 11/2013 | |
| CN | 103941420 | A | 7/2014 | |
| CN | 205157909 | U | 4/2016 | |
| CN | 106842613 | A | 6/2017 | |
| CN | 107861262 | A | 3/2018 | |
| CN | 208421444 | U * | 1/2019 | ............ A61B 3/04 |
| CN | 109581690 | A | 4/2019 | |
| CN | 109946849 | A | 6/2019 | |
| CN | 209570761 | U | 11/2019 | |
| JP | 2003518275 | A * | 6/2003 | |
| WO | 2007041796 | A1 | 4/2007 | |

OTHER PUBLICATIONS

European Extended Search Report, Application No. 20796391.9, dated Dec. 8, 2022, 10 pages.
EP First Office Action, Application No. 20796391.9, dated Dec. 4, 2023, 4 pages.
China First Office Action, Application No. 201910340243.2, dated Dec. 29, 2023, 6 pages.

* cited by examiner

OPTICAL FRAME GLASSES

CROSS REFERENCE TO RELATED APPLICATIONS

This patent Applications is a National Stage Entry of PCT/CN2020/086180 filed on Apr. 22, 2020, which claims the benefit and priority of Chinese Patent Application No. 201910340243.2 filed on Apr. 25, 2019, the disclosures of which are incorporated by reference herein in their entirety as part of the present application.

BACKGROUND

The present disclosure relates to the field of optical glasses, more particularly, to optical frame glasses.

The traditional optical frame glasses are transparent medium lenses worn several millimeters in front of the patient's eyes to correct defects of vision. Through the refraction of light that is compatible with the refractive abnormality of the eye with glasses, the centrally gazed target is imaged on the retina macula of the eye with glasses. Then the eye with glasses can clearly see the centrally gazed target, thereby the defects of vision of the eye with refractive abnormality are corrected. However, such traditional optical frame glasses do not have an effect in controlling the development of myopia.

From the perspective of visual optics, the human eye is not a precise and ideal refractive body. When a spherical cylindrical optical lens is used to accurately correct the ametropia of the eye, the paraxial light entering the eye can be clearly imaged at the retinal level, thereby correcting the ametropia in the centrally gazed area. However, the peripheral image plane formed by the off-axis light entering the eye cannot be accurately imaged at the retinal level, but forms a peripheral defocus, which blurs the peripheral image at the retinal level. By affecting the retinal neurotransmitter level, the blurred image controls the growth of the axial length of the eye, which may lead to the occurrence and development of myopia.

The difference between the real information of the gazed target and the visual imaging information of the eye is called aberration. Usually, there are two kinds of aberrations of the eye. The aberrations that can be accurately corrected by optical lenses are called low-order aberrations, including myopia, hyperopia, astigmatism, etc.; the inherent imaging defects of the eye that conventional optical lenses cannot fully compensate for are called high-order aberrations, including spherical aberration, coma, astigmatism, and so on. Most of the high-order aberrations of the eye come from the irregular and complex shape of the corneal surface. For example, the difference of focal power of the pupil-entering light between the cornea center and the periphery forms a spherical aberration.

In recent years, a rigid air-permeable contact lens for shaping (Ortho-k lens) has been very popular. Wearing this type of contact lens can temporarily modify the shape of the cornea. After the central part of the cornea is quantitatively flattened by the lens, the positive focal power of the eye is reduced, which is used to correct myopia ametropia: the paracentral corneal focus is moderately increased, which induces the high-order aberrations of the eye to be moderately corrected after the reshaping, so that the peripheral blurred image is reduced in the field of vision of the spectacled eye. Clinical practice has confirmed that some eyes wearing this kind of contact lens witness a slowdown in the development of myopia.

However, since the rigid air-permeable contact lens for shaping is in direct contact with the eyes when worn, the wearing method is complicated, the wearer feels uncomfortable, the maintenance is troublesome, and the manufacturing costs are very high. Under this circumstance, it is necessary to design a kind of optical frame glasses with the effect of controlling the occurrence and development of myopia.

BRIEF DESCRIPTION

In view of the above-mentioned shortcomings in the prior art, the present disclosure designs a kind of optical frame glasses capable of controlling the development of myopia based on actual clinical tests and precise calculations.

The embodiments of the present disclosure provide optical frame glasses. The optical frame glasses include lens, and are characterized in that the lens has a circular central area and a plurality of annular focus-increasing compensation areas surrounding the central area, the center of the circular central area coincides with the optical center of the lens, wherein the positive focal powers of the central area and the plurality of focus-increasing compensation areas progressively increase in a radially outward direction.

The lens may have five focus-increasing compensation areas of equal width, the diameter of the central area is 2 mm, and the ring width of each of the focus-increasing compensation areas is 2 mm.

The increase value of the positive focal powers of the five equal-width focus-increasing compensation areas, which are arranged successively in the radially outward direction, relative to the central area may be 0.01D, 0.03D, 0.07D, 0.12D, and 0.18D, respectively.

The central area and the plurality of focus-increasing compensation areas may constitute a static field of view of the lens.

The optical frame glasses in the embodiments of the present disclosure have at least the following advantages:

The optical frame glasses of the present disclosure can eliminate high-order aberrations of the eye, thereby limiting the occurrence and development of myopia. In addition, the optical frame glasses of the present disclosure do not touch the eyeballs, the wearing method is simple, no discomfort is caused after worn, the maintenance method is simple, and the manufacturing cost is low.

DETAILED DESCRIPTION

The embodiments of the present disclosure are described below with reference to the drawings. In the following description, many specific details are explained to enable those skilled in the art to understand and implement the disclosure more comprehensively. However, it is obvious to those skilled in the art that the implementation of the present disclosure may not have some of these specific details. In addition, it should be understood that the present disclosure is not limited to the specific embodiments described. On the contrary, any combination of the features and elements described below may be considered to implement the present disclosure, regardless of whether they involve different embodiments. Therefore, the following aspects, features, embodiments, and advantages are for illustrative purposes only, and should not be regarded as elements or limitations of the claims, unless explicitly stated in the claims.

1. Analysis of Basic Principle

Figure 1:
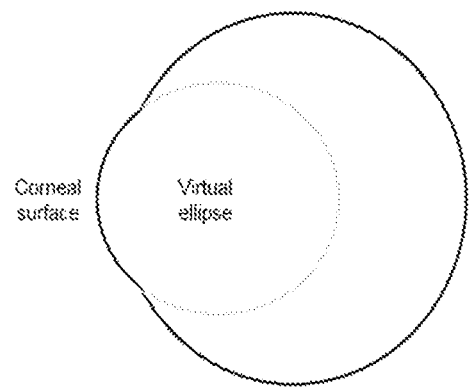
FIG. 1 schematically shows the cornea of a human eye.
Figure 2A:
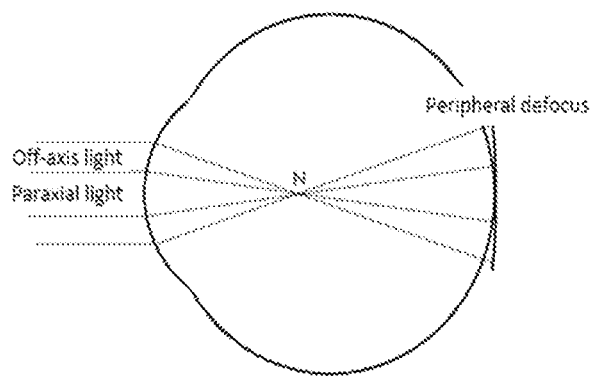
FIGS. 2A and 2B schematically show the principle that the lens of the optical frame glasses of the present disclosure compensates for the spherical aberration of the cornea.
Figure 2B:
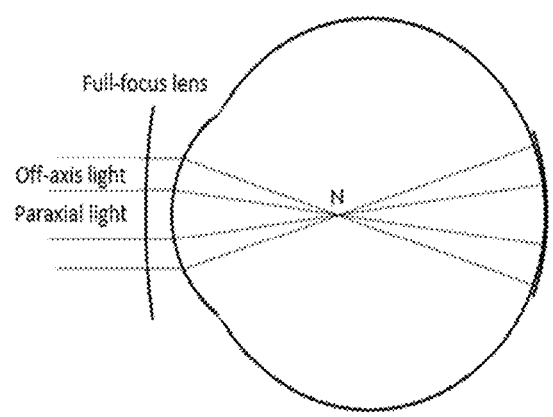

As shown in FIG. 1, the front surface of the cornea is a portion of an arc surface in the long-axis direction of the ellipse. The center has the maximum curvature, exhibiting the largest focal power, while the curvature of the periphery slows down gradually, showing a decrease in focal power. Since the eccentricity of the actually measured corneal contour is greater than 0 but less than 1, the corneal contour can be virtualized as an ellipse after it is extended according to the morphological trajectory of the cornea. The center of the cornea and the periphery form a comparative focal power difference, resulting in defocusing of the periphery of the focal image plane (as shown in FIG. 2A). Statistics show that the individual differences in corneal elliptical eccentricity are normally distributed. If the average value of corneal elliptical eccentricity is used to design a spherical aberration compensation scheme, spherical aberrations of most glasses-worn eyes can be approximately compensated for. The specific design plan is as follows: taking the optical center of the optical lens as the zero point, designing several annular areas in the field of view around the zero point of the lens, and moderately increasing the focus at a gradual gradient, so that the light incident on the periphery of the lens can quantitatively compensate for the spherical aberration caused by gradual reduction of the focus at the periphery of the corneal ellipse. Thereby the focal image surface of the peripheral area of the visual field can approach the retina appropriately (as shown in FIG. 2B), so as to improve the imaging quality of the visual field of the eye and limit the occurrence and development of myopia.

2. Setting of the Static Field of View of the Lens

Suppose that the projection range of the eye's field of view on the lens is the static field of view of the lens when the line of sight of the spectacled eye points to the gazed target through the optical center of the lens with the largest pupil. Of course, since the position of the frame glasses is fixed, the gaze eye can rotate about 25° toward the periphery to form a larger dynamic field of view, which, however, is beyond the scope of the design of the present disclosure.

(1) Visual Angle of the Eye when Looking at a Distant Target

Figure 3:
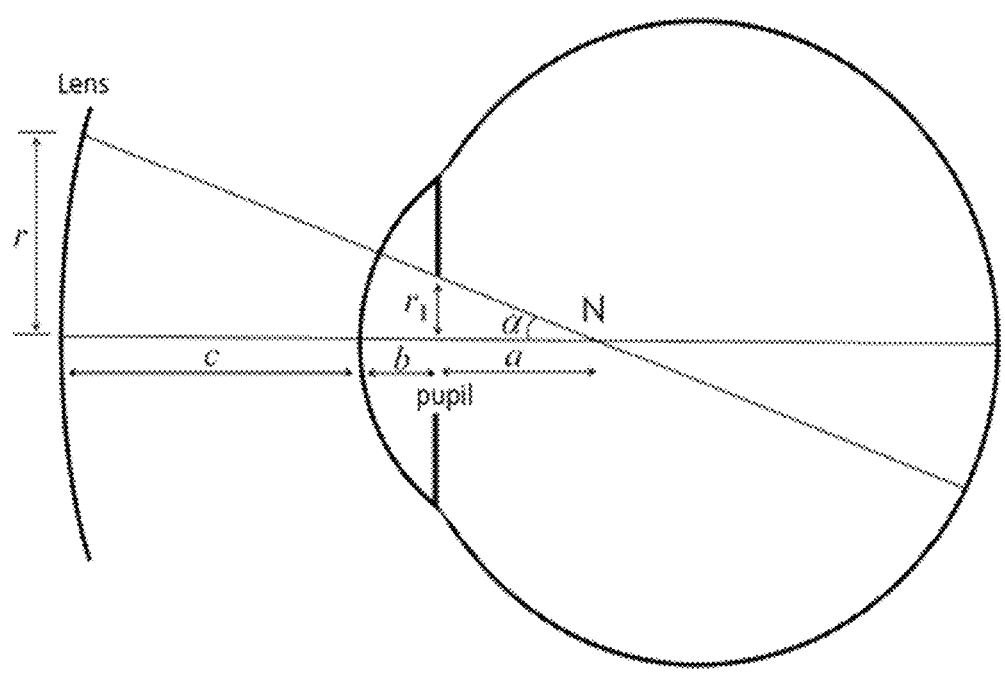
FIG. 3 schematically shows the visual field angle of the human eye and the static field of view of the lens when the eye is gazing at a distant target.

When the eye is looking at a distant target, the pupil diameter is the maximum physiological value. As shown in FIG. 3, when the eye is looking at a distant target, the light incident from the edge of the pupil is refracted by the refractive system of the eye and intersects with the main optical axis of the eye at the intersection N. Suppose that the angle $\alpha$ between the light incident from the edge of the pupil and the main optical axis of the eye is the visual angle of the eye when gazing at a distant target. The angle $\alpha$ can be calculated as follows:

It is known that the actually measured average value of the pupil radius r1 when gazing at a distant target is about 2.386 mm, and the actually measured average value of the distance a from the pupil plane to the intersection N is about 4.133 mm.

Seek to calculate the visual angle $\alpha$ between the light incident from the edge of the pupil and the main optical axis of the eye.

Solution: $\tan \alpha = r/a = 2.386/4.133 = 0.5773$, $\alpha \approx 30°$.

(2) Radius of the Static Field of View of the Lens

Suppose that the average radius of the visual angle on the projection area of the optical lens is r when the eye is gazing at a distant target, then r can be calculated as follows:

It is known that the visual angle $\alpha$ of the eye is about 30°, the actually measured average value b of the distance between the front central point of the cornea and the pupil plane is about 3.067 mm, and the distance c between the back vertex of the optical lens and the front central point of the cornea is about 12 mm.

Seek to calculate the radius r of the static field of view of the lens.

Solution: $r = \tan 30(a+b+c) = 0.5773 \times 19.2 = 11.08$ (mm).

Figure 4:
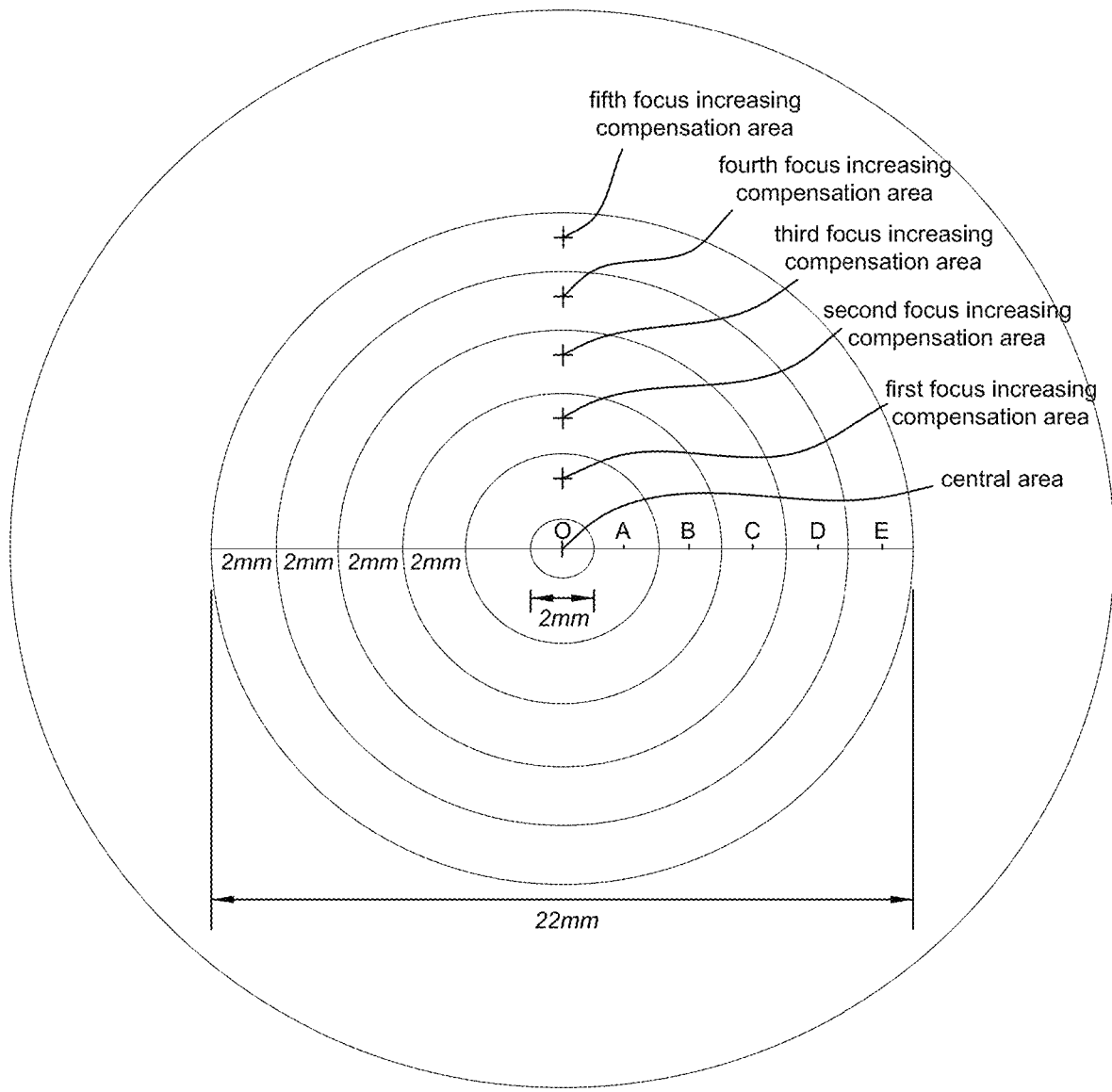
FIG. 4 schematically shows the sizes of the central area and the focus-increasing compensation areas of the optical frame glasses in the present disclosure.

3. Design of the Number and Width of Focusing-Increasing Compensation Areas of the Lens According to the above calculation, the circular diameter of the static field of view of the lens is about 22 mm. As shown in FIG. 4, a circle of 2 mm is drawn at the geometric center of the lens as the central area. Then concentric circles are drawn around the central area with an increasing gradient radius of 2 mm to form 5 equal-width annular focus-increasing compensation areas, namely the first, second, third, fourth, and fifth focus-increasing compensation areas. Positive focal powers of the central area and the five focus-increasing compensation areas progressively increase in a radially outward direction.

Figure 5:
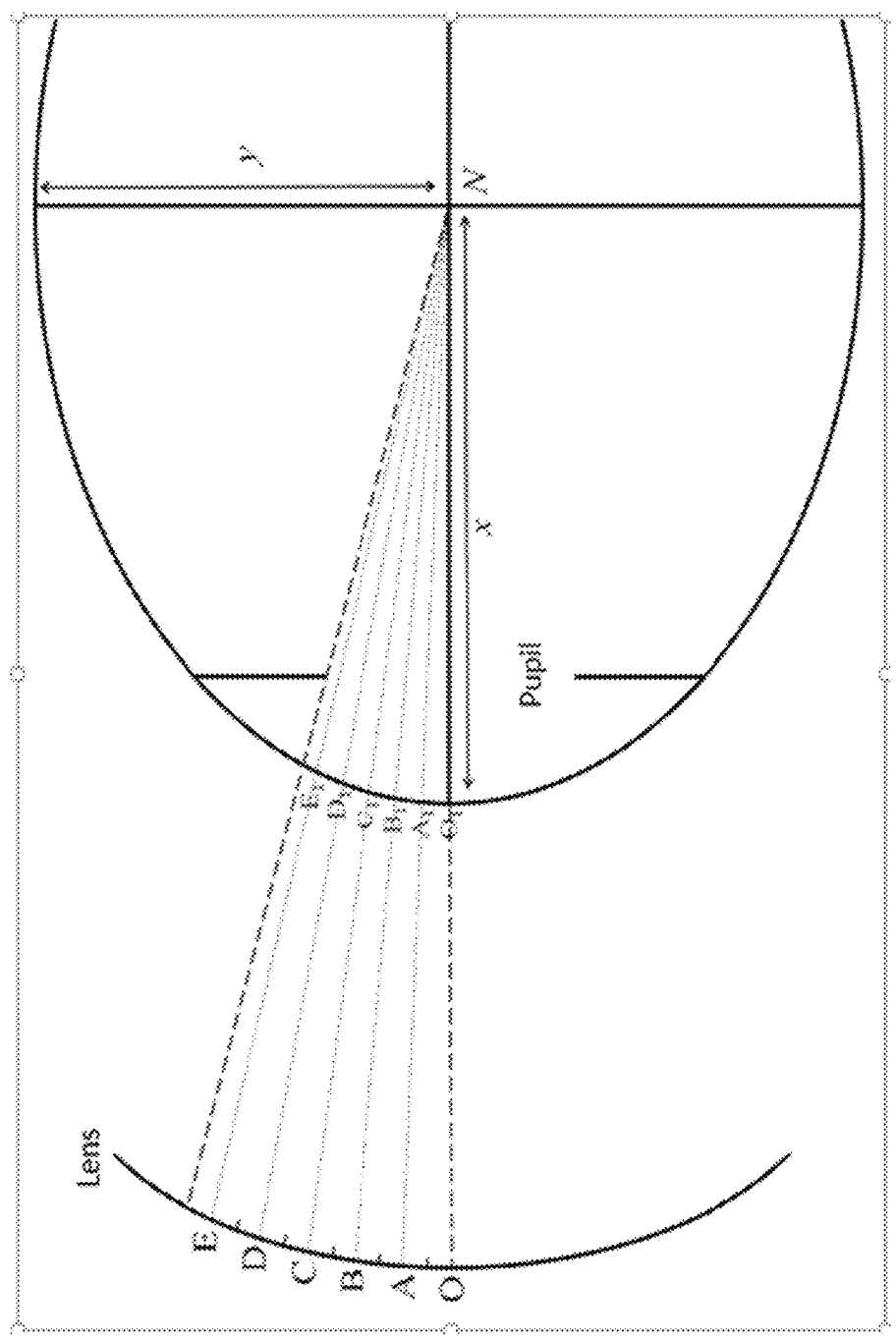
FIG. 5 schematically shows the calculation process of the zoom value of the focus-increasing compensation area of the optical frame glasses of the present disclosure.

4. Design of Zoom Values of the Focus-Increasing Compensation Areas of the Lens As shown in FIG. 5, suppose the geometric central point of the lens is O, take the points A, B, C, D, and E at the midpoints of the ring widths of the 5 focus-increasing compensation areas of the lens, and draw a straight line from each of the 6 points to the intersection N, then the straight line intersects the cornea at points O1, A1, B1, C1, D1, and E1. It is known that the positive focal power of the cornea decreases gradually from the geometric center to the periphery. Try to calculate the gradual decrement value of the positive focal power of the 5 points A1, B1, C1, D1, and E1 of the cornea, and then design the focus-increasing compensation areas containing the 5 points A, B, C, D and E corresponding to A1, B1, C1, D1, and E1 to have an equal increase in positive focal power, i.e. take the increase value of positive focal power of the points A, B, C, D, and E as those of the first, second, third, fourth, and fifth focus-increasing compensation areas containing the points A, B, C, D, and E, respectively, then the lens can approximately compensate for the spherical aberration formed by the corneal elliptical shape.

Known: Summarize the actually measured high-order aberration residual of the eye after refractive correction, suppose the decrease value of positive focal power at the corneal central point O1 to be 0, then the decrease value of positive focal power at the corneal point E1 is about −0.18D. Suppose the actually measured average value of the curvature power at the corneal geometric central point O1 is about 43.58D, then the long semi-axis x of the corneal ellipse is about 7.7444 mm: suppose the actually measured average value of eccentricity of the corneal ellipse is about 0.439, then the short semi-axis y of the corneal ellipse is about 6.958 mm. Since the center of the corneal ellipse is close to the intersection N, it can be considered that the central angle of each zoom arc is about 5.45°, so the distances x1, x2, x3, x4, and x5 from the five points A1, B1, C1, D1, and E1 to the center can be calculated respectively using the formula of the distance to center of ellipse, and then the positive focal power decrease value of A1, B1, C1, D1, and E1 can be calculated.

Seek to calculate the increase value in the positive focal powers of the first, second, third, fourth, and fifth focus-increasing compensation areas where the points A, B, C, D, and E of the lens are located respectively.

Solution 1: The distance to center x1, x2, x3, x4, and x5 of points A1, B1, C1, D1, and E1 on the cornea are calculated as follows:

$$x_1^2 = x^2y^2/[x^2(\sin 5.45)^2 + y^2(\cos 5.45)^2],\ x_1 = 7.7357 \text{ (mm)}$$

$$x_2^2 = x^2y^2/[x^2(\sin 10.9)^2 + y^2(\cos 10.9)^2],\ x_2 = 7.7108 \text{ (mm)}$$

$$x_3^2 = x^2y^2/[x^2(\sin 16.35)^2 + y^2(\cos 16.35)^2],\ x_3 = 7.6718 \text{ (mm)}$$

$$x_4^2 = x^2y^2/[x^2(\sin 21.8)^2 + y^2(\cos 21.8)^2],\ x_4 = 7.6196 \text{ (mm)}$$

$$x_5^2 = x^2y^2/[x^2(\sin 27.25)^2 + y^2(\cos 27.25)^2],\ x_5 = 7.5572 \text{ (mm)}$$

Solution 2: According to the calculation results of the above distance to center, it can be seen that the focal power reduction ratios of A1, B1, C1, and D1 on the cornea are 4.6%, 17.9%, 38.7%, and 66.6%, respectively.

In summary, assuming that the positive focal power decrease value at the central point O1 of the cornea is 0, then the positive focal power decrease value at points A1, B1, C1, D1, and E1 are as follows:

$$A_1 = -0.01D, B_1 = -0.03D, C_1 = -0.07D, D_1 = -0.12D, E_1 = -0.18D.$$

Then the positive focal power increase value of the points A, B, C, D, and E of the lens relative to the geometric central point O of the lens are as follows:

$$A = 0.01D, B = 0.03D, C = 0.07D, D = 0.12D, E = 0.18D.$$

Therefore, the positive focal power increase value of the first, second, third, fourth, and fifth focus-increasing compensation areas where points A, B, C, D, and E of the lens are located relative to the central area are 0.01D, 0.03D, 0.07D, 0.12D, and 0.18D, respectively. For example, if the optical frame glasses are near-sighted glasses and the focal power of the central area of the lens is −3D, the focal powers of the first, second, third, fourth, and fifth focus-increasing compensation areas are −2.99D, −2.97D, −2.93D, −2.88D, and −2.82D, respectively. If the optical frame glasses are farsighted glasses and the focal power of the central area of the lens is +3D, the focal powers of the first, second, third, fourth, and fifth focus-increasing compensation areas are +3.01D, +3.03D, +3.07D, +3.12D, and +3.18D, respectively.

5. Beneficial effects of the present disclosure

The optical frame glasses of the present disclosure can eliminate high-order aberrations (spherical aberrations) of the eye, thereby limiting the occurrence and development of myopia. Particularly, the optical frame glasses of the present disclosure can reduce the incidence of myopia among the children who are very likely to develop myopia. In addition, the optical frame glasses of the present disclosure do not touch the eyeballs, the wearing method is simple, no discomfort is caused after worn, the maintenance method is simple, and the low manufacturing cost is low.

The above embodiments are examples in the present disclosure, but the present disclosure is not limited thereto. Any changes and modifications made by those skilled in the art without departing from the spirit and scope of the present disclosure shall be included in the scope of protection of the present disclosure. Therefore, the scope of protection of the present disclosure shall be determined by the terms of the claims.

What is claimed is:

1. Optical frame glasses comprising a lens, wherein the lens has a circular central area and a plurality of annular focus-increasing compensation areas surrounding the central area, wherein the center of the circular central area coincides with the optical center of the lens, and wherein positive focal powers of the central area and the plurality of focus-increasing compensation areas progressively increase in a radially outward direction;

wherein the lens has five focus-increasing compensation areas of equal width, wherein the diameter of the central area is 2 mm, and wherein the ring width of each of the focus-increasing compensation areas is 2 mm; and wherein the increasing values of the positive focal powers of the five equal-width focus-increasing compensation areas, which are arranged successively in the radially outward direction, relative to the central area are 0.01D, 0.03D, 0.07D, 0.12D, and 0.18D, respectively.

2. The optical frame glasses according to claim 1, wherein the central area and the plurality of focus-increasing compensation areas constitute a static field of view of the lens.

* * * * *